United States Patent Office 3,767,794
Patented Oct. 23, 1973

3,767,794
ANTIFOAM PREPARATIONS AND METHOD OF PREPARING SAME
Duncan E. McVean and Paul A. Tuerck, Cincinnati, Ohio, assignors to Richardson-Merrell Inc., New York, N.Y.
No Drawing. Filed Nov. 21, 1969, Ser. No. 878,943
Int. Cl. A61k 27/00
U.S. Cl. 424—157
6 Claims

ABSTRACT OF THE DISCLOSURE

An antifoaming product, which retains its antifoaming activity in the presence of anti-acids and other drugs, is prepared by suspending up to 20% by weight of an antifoaming organo-polysiloxane, such as simethicone, in molten sorbitol, cooling the suspension to harden it and thereafter reducing it to a powder of a particle size larger than about 115 mesh. The new antifoaming compositions may be used in therapeutically active amounts in the preparation of compositions for the relief of gastrointestinal distress caused by flatulency.

This invention relates to stable antiform compositions which are particularly useful in the preparation of anti-acids and other preparations for the relief of gastrointestinal distress. The compositions also provide for a convenient method of disbursing and dispersing antifoam compositions in solid form.

A material which has been given the non-proprietary name of simethicone has been in use for more than ten years as an antifoaming agent for the relief of frothy bloat and related conditions in ruminents and for the treatment of gastrointestinal disorders in humans. This material is a composition consisting essentially of dimethylpolysiloxane and 4% to 4½% by weight of a silica aerogel. For example, the silicone fluid of the composition, as produced by Dow-Corning Chemical Company, has a molecular weight of between 14,000 and 21,000, a silicon content of 37.3 to 38.5%, a viscosity at 25° C. of from 300 to 600 centistokes (cs.), a specific gravity at 25° C. of from 0.965 to 0.970, and a refractive index, $n_D^{25}$ of 1.403±0.002.

One form of the product is sold under the trade name DC Antifoam A. Another form of the same material is an emulsion referred to in the trade as DC Antifoam AF. These are products of the Dow-Corning Chemical Company. Similar materials are available from other sources. These antifoaming agents and other polysiloxane compositions, and their use in the treatment of gastrointestinal disorders, are described in U.S. Pat. Nos. 2,635,981, issued to Austin et al., 2,934,472, issued to May, 2,951,011, issued to Feinstone, and 3,422,189, issued to Rider.

As noted by Rezak, J. Pharm. Sci. 55, 538–9 (1966), the foam-depressing action of these silicone preparations is inactivated to some extent when they are placed in contact with many commonly used anti-acid materials. Loss of their antifoam activity is accelerated at elevated temperatures. Some of the most commonly used anti-acid materials, such as aluminum hydroxide, magnesium carbonate and magnesium trisilicate, are particularly harmful to the antifoaming activity of simethicone.

To illustrate the inactivation of simethicone in several typical anti-acid preparations, the following products were prepared. In each case the powders were weighed, placed in a mortar and triturated, and stored in tightly-closed glass bottles.

EXAMPLE A

| | Gm. |
|---|---|
| Sodium Carboxymethylcellulose | 0.3 |
| Magnesium trisilicate | 0.2 |
| Simethicone | 20 |

EXAMPLE B

| | Gm. |
|---|---|
| Magnesium trisilicate | 0.5 |
| Aluminum hydroxide dried gel | 0.25 |
| Simethicone | 20 |

EXAMPLE C

| | Gm. |
|---|---|
| Sodium bicarbonate | 0.275 |
| Calcium carbonate | 0.15 |
| Magnesium carbonate | 0.1 |
| Magnesium trisilicate | 0.07 |
| Simethicone | 20 |

Similar anti-acid products were prepared in which the simethicone was replaced with 0.1 gram of the antifoam product of the present invention containing 20 mg. of simethicone. The antifoaming performance of the six different products was determined in the following manner:

Thirty grams of a commercially available surfactant, an alkyl phenoxy polyethoxy ethanol, was dispersed in 3 liters of 0.1 N hydrochloric acid and 100 milliliters of this solution was placed in clean 8-ounce bottles with each of the six products described above. The bottles were closed and inverted ten times rapidly. The length of time in seconds for the foam to collapse was determined with a stopwatch. This procedure was repeated ten times, and the average time for the foam to collapse was determined. When the six products were tested in this manner, the following results were observed:

| Product | After 1 week at— | |
|---|---|---|
| | R.T., sec. | 56° C., sec. |
| A | 180+ | 180+ |
| B | 180+ | 180+ |
| C | 65 | 61 |
| A plus antifoam of invention | 2.9 | 12 |
| B plus antifoam of invention | 2.2 | 40 |
| C plus antifoam of invention | 5.0 | 2.1 |

Two commercially available anti-acid products, one said to contain magnesium hydroxide, 200 mg., aluminum hydroxide, 200 mg. simethicone, 200 mg., and the other containing unstated amounts of mangesium carbonate, magnesium hydroxide, aluminum hydroxide and 25 mg. of simethicone, were tested for their antifoaming activity. The tablets were triturated in a mortar and placed in an 8-ounce bottle with 100 ml. of 0.1 N hydrochloric acid containing the same surfactant as used in the experiments described above. These bottles were placed in a 37° C. water bath for two hours (to simulate body temperature and acidity of the stomach). At the end of this time the bottles were inverted ten times to develop a foam. In each case the foam had not collapsed in three minutes, and it was considered that neither product possessed satisfactory antifoam activity. Obviously the anti-foaming component of these preparations, simethicone, had been deactivated since the tablets had been prepared.

The instability of the antifoaming properties of simethicone in the presence of conventional anti-acid agents, and the desirability of having such tablets with antifoaming activity which is stable over a long period of time led to the present invention. Various attempts were made to protect the simethicone from contact with the anti-acids with which it might be mixed. Successful efforts were as follows:

EXAMPLE 1

100 grams of sorbitol and 67 grams of DC Antifoam AF emulsion were mixed and heated to 125° C. with mixing. Heating was discontinued, but stirring was continued until the temperature of the mixture was about 50° C. The molten material was then poured onto a stainless steel tray to form a thin film. Upon hardening, the thin film was placed in a freezer until it was cold. It was then reduced to particles which would pass through a 10 mesh screen. A commercially available anti-acid preparation of the following composition was used in this experiment:

|  | Mg. |
|---|---|
| Aluminum hydroxide (supplied as dried aluminum hydroxide gel) | 180.0 |
| Magnesium hydroxide | 170.0 |
| Methylcellulose | 50.0 |
| Dicyclomine hydrochloride | 2.5 |

To a granulation of the above composition there was added an equivalent of 20 mg. of the simethicone, as the preparation just described, and the mixture was compressed into a tablet. When tested for its antifoaming activity by the procedure described above, it was found that the foam was depressed within two seconds, and this activity remained after storage of the tablets for one week at room temperature and also at 56° C.

To a granulation of the above composition there was added the equivalent of 20 mg. of the simethicone, without protection, and the mixture was compressed into a tablet. When tested for its antifoaming activity by the procedure described above, it was found that the foam was not depressed after 180 seconds, which indicated that the simethicone was inactivated by the anti-acids of the composition.

The simethicone was enrobed in the sorbitol by other methods, as is demonstrated by the following examples.

EXAMPLE 2

Crystals of sorbitol were heated to 130° C. to obtain molten sorbitol. Fifty grams of simethicone (DC Antifoam A), was stirred into 950 grams of the molten sorbitol and stirring was continued while the mass cooled to 70° to 75° C. The material was then poured onto a metal candy plate and allowed to harden. It was ground and passed through a No. 12 screen. This material maintained its antifoaming activity when mixed with various anti-acid materials.

EXAMPLE 3

In the event it is desired to use commercial solutions of sorbitol, instead of solid sorbitol, one may heat the sorbitol solution to remove the water and then cool it to 130° C., mix it with the simethicone, cool it until it hardens and then grind it to a suitable degree of fineness.

Protected simethicone prepared by the methods illustrated in Examples 2 and 3 was added to the anti-acid preparation described in Example 1. Again, when tested for its antifoaming activity by the procedure described earlier, comparable results to those described for the material in Example 1 were found.

During the numerous experiments that were conducted it was found that it was possible to incorporate up to 20% by weight of simethicone in molten sorbitol, and thereafter cool, harden and grind the material to form an antifoaming composition that is stable in the presence of anti-acids. 20% of simethicone in sorbitol seems to be an upper practical limit. When simethicone was incorporated in a concentration of 30% into molten sorbitol, the mass did not harden. Furthermore, simethicone is not protected as well from anti-acids when the antifoam product contained 20% of simethicone in sorbitol, as where the product contained a lower amount of simethicone. For example, when anti-acid tablets containing aluminum hydroxide and magnesium hydroxide were prepared and stored for three weeks at 45° C. it required 3.2 seconds for the foam to collapse where the anti-foaming products consisted of 20% simethicone and 80% sorbitol. When the antifoaming agent contained 10% of simethicone and 90% sorbitol the foam collapsed in 4.8 seconds. When the antifoaming composition consisted of 5% of simethicone enrobed in 95% of sorbitol, in accordance with the present invention, the foam collapsed in 3.2 seconds. These latter tablets were found to be stable for three months at 37° C., collapsing the foam in 3.2 seconds, whereas the 20% simethicone product required 60 seconds to collapse the foam.

The practical range of concentration of simethicone in sorbitol is about 0.1 to 20% by weight. The lower limit has been established on the basis of 20 mg. of simethicone being the therapeutic dose. Twenty (20) grams of sorbitol antifoam powder, containing 0.1% simethicone, would be required to deliver 20 mg. of simethicone. This amount of sorbitol is close to a laxative dose. With regard to the upper limit, experience has shown that at a level of 20% simethicone the enrobing agent does not provide sufficient protection from the anti-acids. The optimum concentration appears to be 5% to 10%, depending upon the volume of antifoam powder that can be tolerated in the formulation.

The granules of the sorbitol-simethicone anti-foaming product of the present invention should be greater than about 115 mesh. If the material is ground finer than this the simethicone will not be as well-protected from the anti-acids as is desirable. Preferably the hardened sorbitol/simethicone product should be ground to pass a 12-mesh screen, but be retained on a 15-mesh screen. Powders so prepared have a discrete fluid-granular character and do not tend to cake. They are easily mixed with other conventional components of anti-acid tablets, such as aluminum and magnesium hydroxides, magnesium trisilicate, bismuth subcarbonate, calcium carbonate, phenobarbital, anticholinergics, enzymes, belladonna and the like, binders and excipients, such as sugar, lactose, dextrose, starch, talc and other pharmaceutically acceptable, non-toxic powders and lubricants which are also compatible with the antifoam agent of the present invention.

What is claimed is:

1. A method of preparing a composition effective in depressing foam in aqueous systems which comprises melting sorbitol and uniformly dispersing therein 0.1 to 20% by weight of the sorbitol, a non-toxic foam-depressing simethicone, cooling the mass to harden it, and grinding the solid product to particle sizes that will pass through a 12-mesh screen but not through a 115-mesh screen.

2. The antifoam composition prepared by the process of claim 1.

3. The antifoam composition of claim 2 containing simethicone in the antifoaming composition in an amount of from 5 to 10% by weight of the sorbitol.

4. A method of preparing an antifoaming antacid composition which comprises melting sorbitol and dispersing from 0.1 to 20% by weight of simethicone in the molten sorbitol, allowing the molten mass to harden, grinding the hardened product and recovering from the ground material those particles which pass through a 12-mesh screen but not through a 115-mesh screen and incorporating said recovered particles into a non-toxic pharmaceutically acceptable antacid.

5. The antifoaming antacid composition prepared by the process of claim 4.

6. The antifoaming antacid composition of claim 5 containing simethicone in the antacid composition in an amount of from 5 to 10% by weight of the sorbitol.

References Cited

UNITED STATES PATENTS

| | | | |
|---|---|---|---|
| 2,635,981 | 4/1953 | Austin et al. | 424—184 |
| 2,934,472 | 4/1960 | May | 424—184 |
| 3,382,150 | 5/1968 | Grass, Jr. et al. | 424—184 |
| 3,422,189 | 1/1969 | Rider | 424—184 |

FOREIGN PATENTS

| | | | |
|---|---|---|---|
| 728,759 | 4/1955 | Great Britain | 424—31 |
| 914,925 | 1/1963 | Great Britain | 424—184 |
| 971,486 | 9/1964 | Great Britain | 424—184 |
| 1,129,260 | 10/1968 | Great Britain | 424—184 |

ALBERT T. MEYERS, Primary Examiner

F. E. WADDELL, Assistant Examiner

U.S. Cl. X.R.

252—321, 358; 424—35, 127, 155, 156, 184

PO-1050
(5/69)

UNITED STATES PATENT OFFICE
CERTIFICATE OF CORRECTION

Patent No. 3,767,794      Dated October 23, 1973

Inventor(s) Duncan E. McVean and Paul A. Tuerck

It is certified that error appears in the above-identified patent and that said Letters Patent are hereby corrected as shown below:

Column 1, line 24, "antiform" should read "antifoam"; Column 1, line 37, "fluide" should read "fluid". Column 2, line 7, "20 GM" should read "20 mg"; Column 2, line 12, "20 GM" should read "20 mg"; Column 2, line 20, "20 GM" should read "20 mg"; Column 2, line 48, "simethicone 200 mg" should read "simethicone 20 mg".

Signed and sealed this 21st day of May 1974.

(SEAL)
Attest:

EDWARD M.FLETCHER,JR.
Attesting Officer

C. MARSHALL DANN
Commissioner of Patents